Oct. 23, 1962     H. Y. MAGEOCH ET AL     3,060,283
CURRENT COLLECTOR ARM
Filed April 1, 1957                                 5 Sheets-Sheet 2
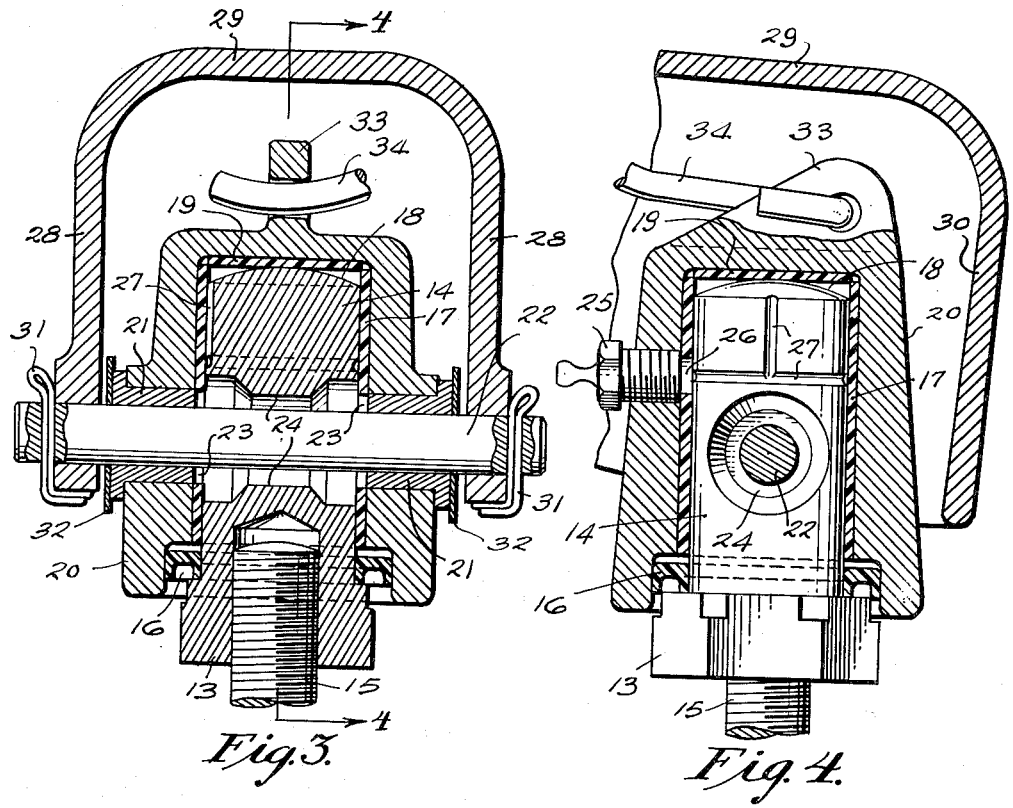
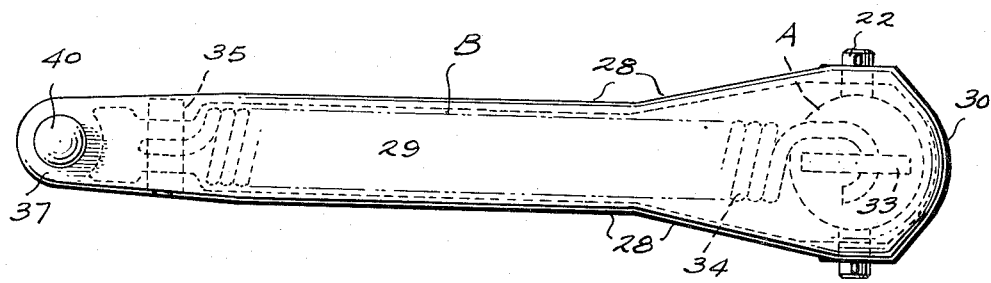
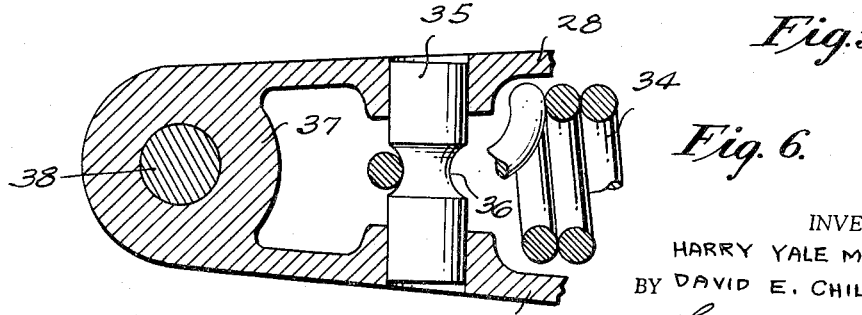
INVENTORS
HARRY YALE MAGEOCH
BY DAVID E. CHILDS
Leon Edelson
ATTORNEY.

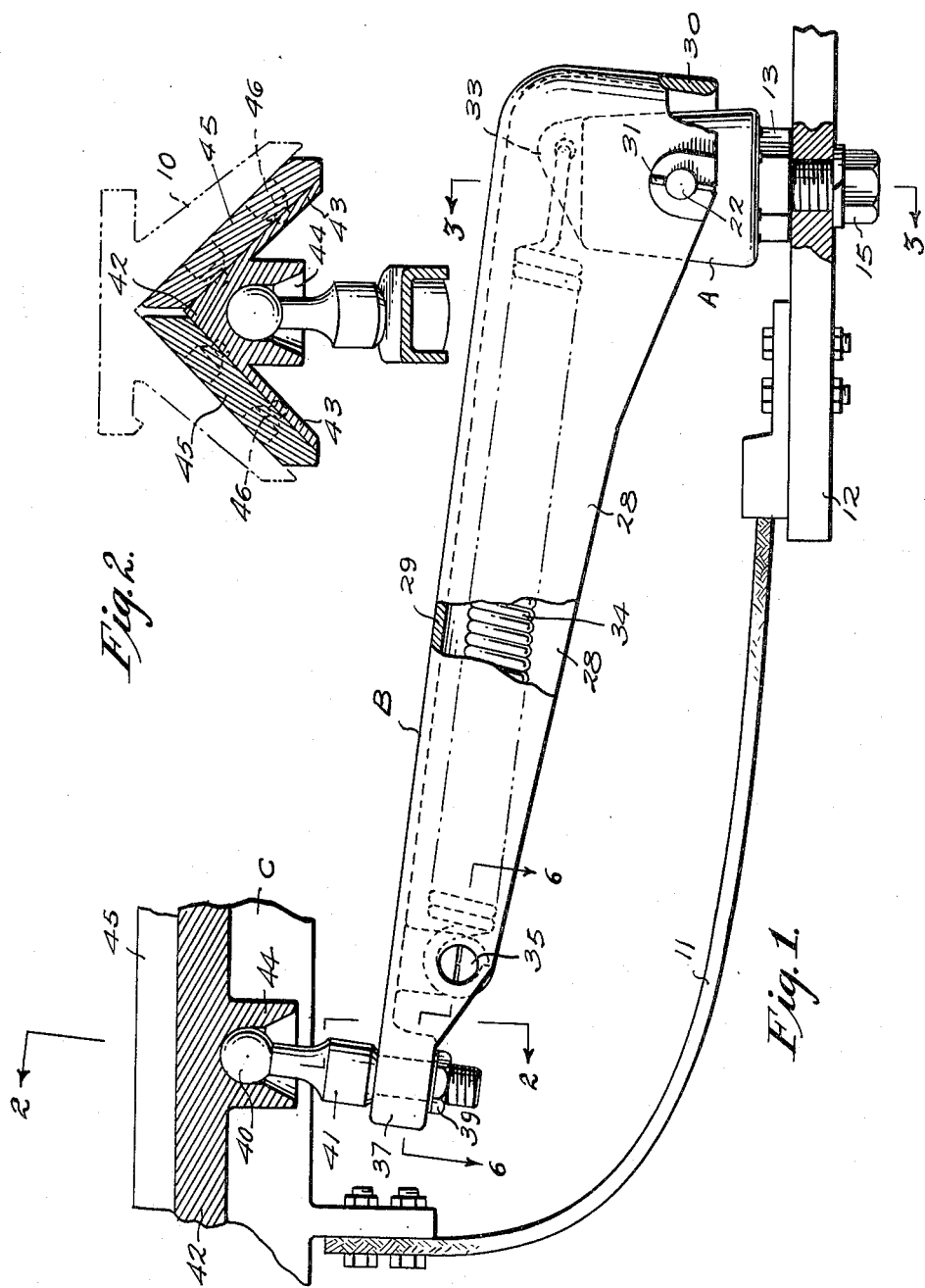

INVENTORS
HARRY YALE MAGEOCH
BY DAVID E. CHILDS

ATTORNEY

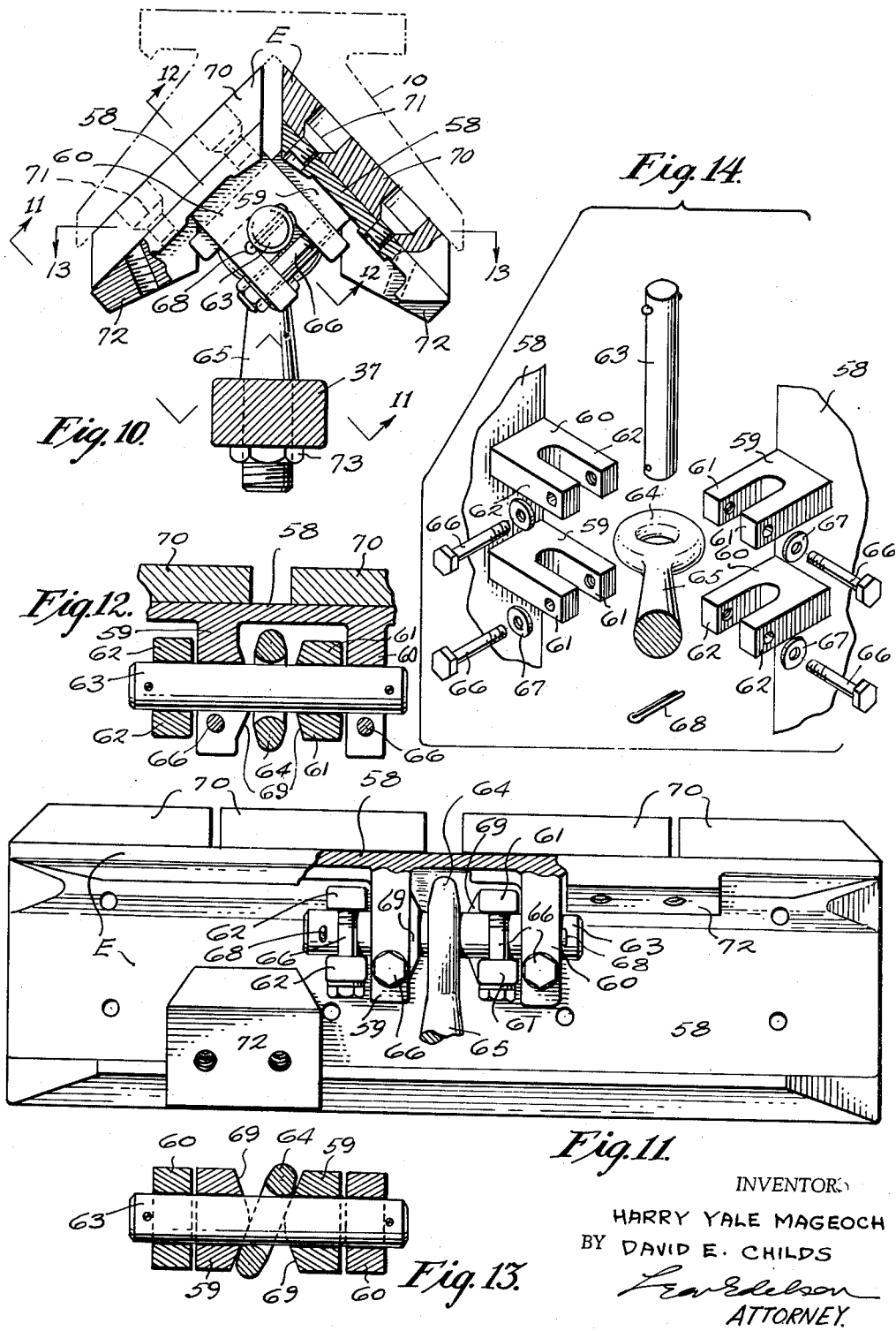

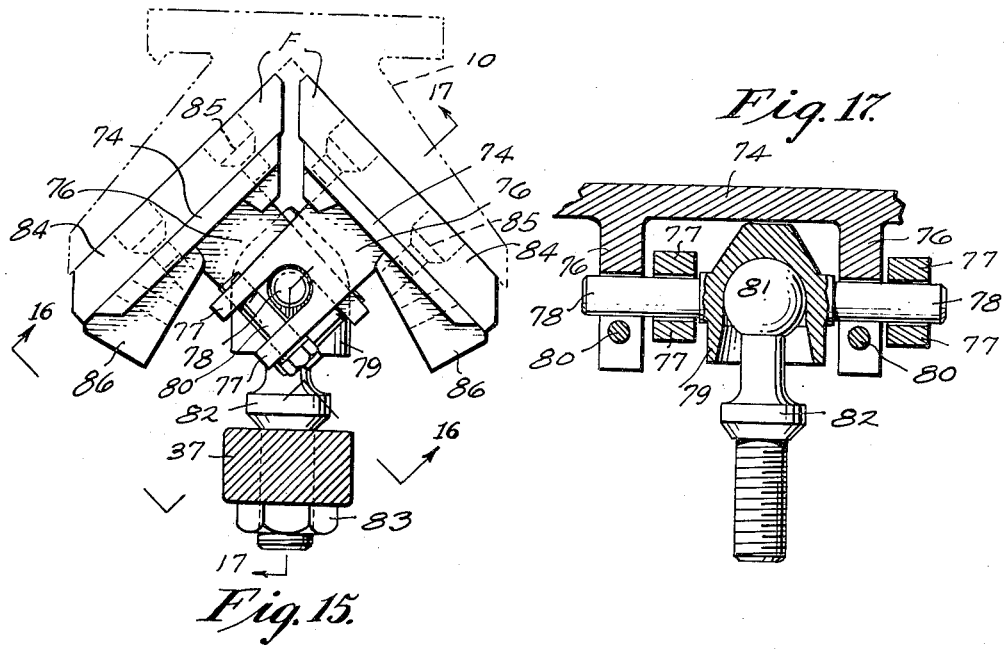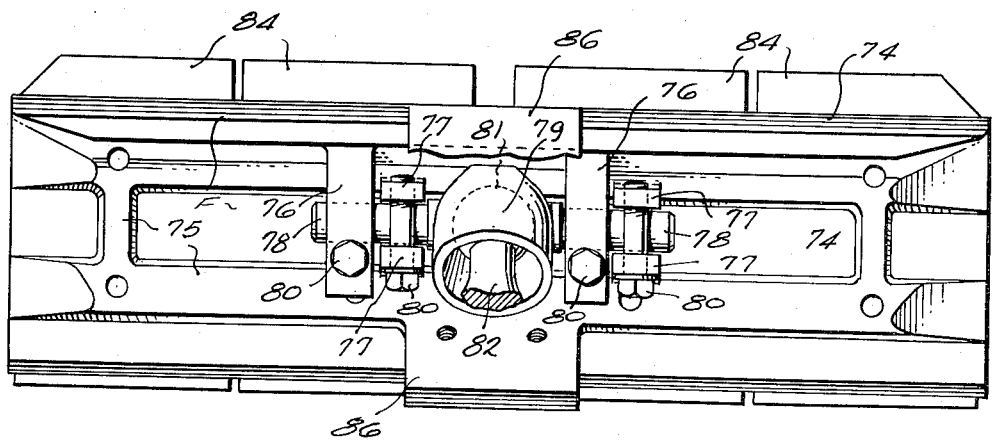

United States Patent Office 3,060,283
Patented Oct. 23, 1962

3,060,283
CURRENT COLLECTOR ARM
Harry Yale Mageoch, Havertown, and David E. Childs, Broomall, Pa., assignors, by mesne assignments, to H. K. Porter Company, Inc., Pittsburgh, Pa., a corporation of Delaware
Filed Apr. 1, 1957, Ser. No. 649,926
10 Claims. (Cl. 191—59.1)

This invention relates generally to apparatus for collecting electric current from a power transmission member and more particularly to such apparatus mounted upon a mobile unit and operating in contact with the power transmission member.

A principal object of the present invention is to provide apparatus having a collector shoe operating in contact with the power transmission member and wherein the electric current collected by the apparatus bypasses the means carrying the collector shoe.

Another principal object of the present invention is to provide such apparatus wherein the means carrying the collector shoe and bypassed by the electric current includes an arm mounting the contact shoe, and means covered by the arm and protected thereby against the elements and operating to yieldably bias said arm and shoe upwardly into contact with the power transmission member.

Still another principal object of the present invention is to provide such apparatus wherein the means carrying the collector shoe and bypassed by the electric current includes a thrust type swivel joint by means of which the same is mounted upon the mobile unit.

And still another principal object of the present invention is to provide such apparatus wherein the swivel joint aforesaid is self-flushing, whereby excessive lubricant supplied thereto under pressure is automatically expelled therefrom.

A further object of the present invention is to provide such apparatus wherein the collector shoe is mounted upon the collector arm for universal type movement, whereby the contact shoe operates in contact and accurate alignment with the power transmission member regardless of horizontal, vertical or angular shifting movement of the swivel joint relative to the power transmission member.

And a further object of this invention is to provide such apparatus wherein the collector shoe is a split type shoe each section of which is mounted more or less independently of the other, in the manner aforesaid.

And a still further object of this invention is to provide such apparatus which affords trouble free performance and reduces the problem of maintenance when replacement of shoes or other parts, or other servicing is necessary.

Further objects and advantages of the present invention will appear more fully hereafter, it being understood that the present invention consists in the combination, construction, location and relative arrangement of parts, as will appear more fully hereinafter, as shown on the accompanying drawings and as finally pointed out in the appended claims.

In the accompanying drawings:

FIGURE 1 is a side elevation of apparatus constructed in accordance with and embodying the principles of the present invention, certain areas being broken away and sectioned.

FIGURE 2 is a transverse section on line 2—2 of FIGURE 1.

FIGURE 3 is a transverse section on line 3—3 of FIGURE 1.

FIGURE 4 is a vertical section on line 4—4 of FIGURE 3.

FIGURE 5 is a plan view of the conductor arm shown in FIGURE 1.

FIGURE 6 is a plan section on line 6—6 of FIGURE 1.

FIGURE 10 is similar to FIGURE 7, but shows a modified split shoe construction.

FIGURE 11 is a view taken as indicated by line 11—11 of FIGURE 10.

FIGURE 12 is a section on line 12—12 of FIGURE 10.

FIGURE 13 is a section on line 13—13 of FIGURE 10.

FIGURE 14 is an exploded perspective view of the modified shoe construction shown in FIGURE 10.

FIGURE 15 is similar to FIGURE 10, but shows a second modified split shoe construction.

FIGURE 16 is a view taken as indicated by line 16—16 of FIGURE 15.

FIGURE 17 is a section taken as indicated by line 17—17 of FIGURE 15.

Figure 7:
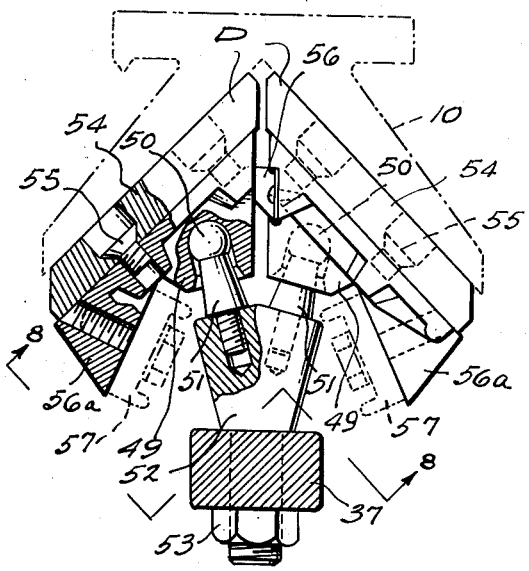
FIGURE 7 is similar to FIGURE 2, but shows a split shoe construction.

The apparatus constructed in accordance with and embodying the principles of the present invention comprises an upright base assembly A, a horizontally extending arm assembly B that projects laterally from the base assembly A, and a shoe assembly C that is operatively mounted upon the arm assembly B. The shoe assembly C is adapted for contact with an electric power conductor 10, and from the shoe assembly C depends a braided flexible shunt strap 11. Electric power from the conductor 10 and shoe assembly C is conducted through the strap 11 to a bus bar 12 that fixedly mounts the base assembly A and which is carried by the mobile unit (not shown) to which the electric power is supplied, for example, a traveling crane.

The base assembly A includes a vertically extending preferredly stainless steel spindle member that has a lower end portion 13 which in transverse section is hexagonal and a main body portion 14 which in transverse section is round and somewhat smaller than the lower end portion 13. The latter is provided with a center tap and fitted with a cap screw 15, which cap screw anchors the spindle member to the bus bar 12, as shown. Fitted over the spindle main body portion 14 and seated upon the spindle lower end portion 13 is a conventional flexible sealing ring 16 that is preferredly made of rubber. Above the latter is a cylindrical sleeve 17 that is fitted over the spindle main body portion 14. The top of the spindle member is rounded, as at 18, so as to form a low friction thrust member, and overlying this rounded top is a disc 19. The cylindrical sleeve 17 and the disc 19 preferredly are made of a suitable bearing material, such as nylon.

Fitted over the spindle member is a preferredly cast iron jacket member 20 that is centerbored for a close fit about the sleeve 17 and counterbored for a similar fit about the sealing ring 16. Diametrically opposite side wall areas of the jacket member 20 are fitted respectively with a pair of bronze bushings 21—21, and a horizontally extending shaft 22 is journalled respectively in these bushings. The portion of the shaft 22 intervening the bushings 21—21 extends freely through the sleeve 17 and the spindle member. It will be observed that the apertures, designated 23—23, formed in the sleeve 17 and the transverse bore, designated 24, formed in the spindle member are all quite large in diameter, relative to the diameter of the shaft 22.

Threaded into the wall of the jacket member 20 is a grease fitting 25 that communicates, through an aperture 26 which is formed in the sleeve 17, with a grease channel 27. The latter extends circumferentially about and vertically to the top of the spindle member, as shown.

The arm assembly B includes a preferredly aluminum elongated member of inverted U-shape in transverse section. Longitudinally extending opposite side walls 28—28 of this member are interconnected by a longitudinally extending top wall 29 and a transversely extending end wall 30. The end of the arm member adjacent the latter is of somewhat enlarged internal size and positioned in covering relation to the jacket member 20. The opposite end portions of the shaft 22 project through opposed areas of the side walls 28—28 and are suitably provided with a pair of cotter pins 31—31 and a pair of washers 32—32.

Extending upright from the top of the jacket member 20 is a projection 33 to which is anchored one end portion of a tension coil spring 34. This coil spring extends horizontally under the top wall 29, and the opposite end of the coil spring is anchored to a horizontally transversely extending pin 35. The end of the coil spring 34 is lodged in a circumferentially extending groove 36, disposed intermediate the opposite end portions of the pin 35, which opposite end portions are slidably fitted respectively into opposed areas of the walls 28—28. The arm B terminates in an apertured boss 37, and the lower end portion of a preferredly stainless steel upright bolt 38 projects through the boss 37, the bolt being secured to the boss 37 by a nut 39 which is threaded thereon. The head of the bolt, designated 40, is round, and a body portion, designated 41, is of enlarged diameter, as shown.

The shoe assembly C includes an elongated main body 42 of inverted V-shape in transverse section. Underlying the longitudinally extending oppositely inclined sides, designated 43—43, is a socket portion 44 that is fitted over and seated upon the round head 40 of the bolt 38. Overlying the oppositely inclined sides 43—43 are suitable contact plates 45—45 that are secured in place by screws 46. Normally, the coil spring 34 operates to bias the arm assembly B upwardly about the shaft 22, in consequence of which the contact plates 45 engage the undersurfaces of the conductor 10.

It will be observed that the spindle and jacket members are electrically insulated from one another effectively by the cylindrical sleeve 17, disc 19, sealing ring 16, and free passage of the shaft 22 through the spindle member, in consequence of which passage of electric current through the arm assembly B to the bus bar 12 is precluded. As indicated hereinbefore, electric power from the conductor 10 is conducted to the bus bar 12 through the contact plates 45, main body 42, and shunt strap 11.

In the operation of the apparatus, the vertical distance between the base assembly A and the conductor 10 may vary and/or the base assembly A may shift laterally relative to the vertical median plane of the conductor 10 during travel of the crane or other mobile unit. In this event, the arm assembly B automatically adjusts by pivoting about the shaft 22 and/or the spindle member, as required. Simultaneously, the shoe assembly C turns freely and tilts fore and aft and/or to either side upon the bolt head 40, as required, to compensate for any change in the angular relation between the bolt 38 and the conductor 10, in consequence of which the contact plates 45 are constantly in full, effective contact with the undersurfaces of the conductor 10.

Preferredly, a lubricant having high dielectric properties is injeced into the base assembly A through the grease fitting 25. The lubricant under pressure is forced through the grease channel 27 to the top of the spindle member and then down between the spindle member and the sleeve 17 to the sealing ring 16. Of course, the lubricant fills the space around the shaft 22, between the bushings 21—21, and excess lubricant is automatically flushed from the base assembly A when the sealing ring 16 yields, due to the pressure exerted thereon by the lubricant. In addition to serving as a dielectric agent, the disc 19 overlying the spindle member serves to enable the arm assembly B, jacket member 20, and shaft 22 to move freely as a unit about the spindle member, even when the base assembly A is dry or devoid of any lubricant. In this connection, at no time during the movement aforesaid does the shaft 22 come into contact with the spindle member.

The proximity of the connection between the arm and shoe assemblies to the conductor 10 is of prime importance because the greater the effective vertical distance, the greater is the tendency of the shoe assembly C to tilt fore and aft as it is moved in contact with the undersurface of the conductor 10. The utilization of a ball and socket type connection inherently lends itself to a construction wherein the effective vertical distance between the connection and the conductor 10 can be held to a minimum.

Whenever the shoe assembly C is not engaged with the conductor 10, the arm assembly B automatically swings upwardly under the influence of the tension spring 34, this movement being limited by engagement of the transversely extending wall 30 of the arm assembly B with the jacket member 20.

The electric current, as indicated hereinbefore, bypasses the base assembly A, the joint upon which the assembly B moves, in consequence of which this joint deteriorates much less rapidly than it would otherwise. Any welding together of the spindle and jacket members is precluded, and therefore friction is reduced. Erosion and/or galvanic corrosion between bearing surfaces of different metals, which action is usually accelerated in the presence of an electric current, is eliminated, and there is no electrolysis between the parts.

The coil spring 34 is effectively protected against falling contaminants and from ice and sleet by the overlying arm. In addition, in a construction wherein the electric current is passed through the arm assembly B, the spring is heated and thereby annealed, in consequence of which it loses its resiliency.

The ease with which the apparatus is disassembled for servicing and repairs is of prime importance. The shoe assembly C may be disconnected from the arm assembly B by merely lifting the same from the bolt 38. The arm assembly B may be disconnected from the base assembly A by merely removing the shaft 22 and disengaging the coil spring 34 from the jacket member 20. The jacket member 20 may now be lifted from the spindle member, or, if desired, the base assembly A may be disengaged as a unit from the bus bar 12 by merely removing the cap screw 15. Normally, the pin 35 is secured against axial shifting movement by the coil spring 34, but it is automatically released for removal when the shaft 22 is removed.

Figure 9:
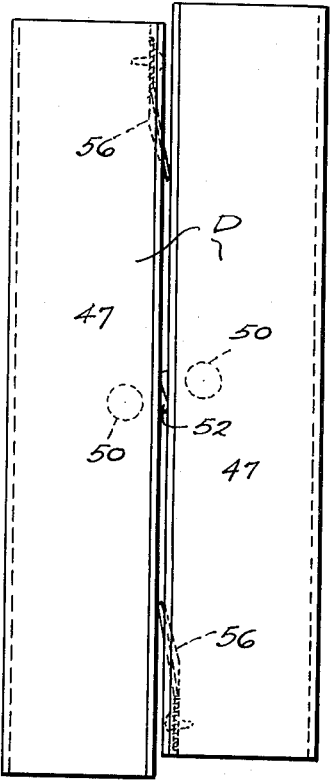
FIGURE 9 is a plan view of the split shoe construction of FIGURE 7, parts being omitted for the sake of clarity, and the sections of the shoe being shown longitudinally displaced relative to one another.
Figure 8:
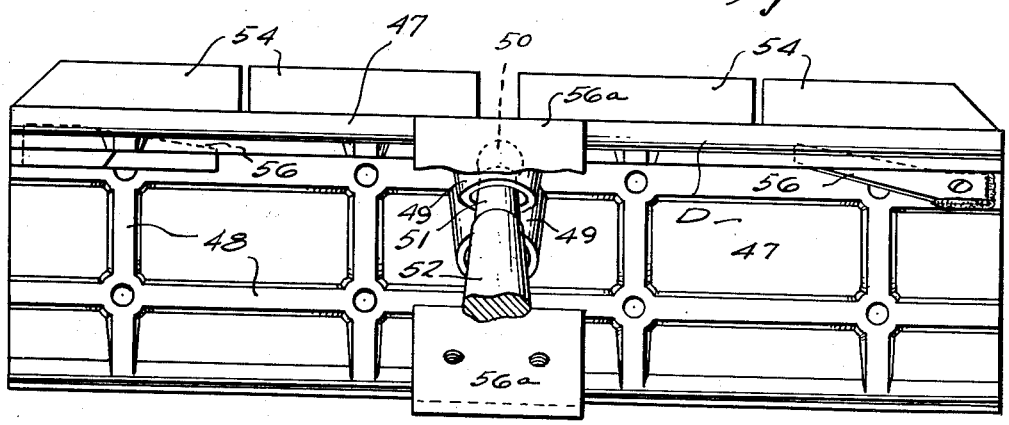
FIGURE 8 is a view taken as indicated by line 8—8 of FIGURE 7.

Referring particularly to FIGURES 7, 8 and 9, the modified shoe assembly shown, designated D, includes a pair of longitudinally extending generally flat rectangular sections 47—47 that are oppositely inclined to conjointly form a shoe of inverted V shape. Underlying each section 47 is a network of reinforcing ribs 48 and a centrally disposed socket portion 49. The latter is fitted over and seated upon the rounded head, designated 50, of a stud 51 which is threaded into the top of a bolt 52. The bolt 52, with the studs 51—51 diverging upwardly therefrom, is projected through and secured to the boss 37 by a nut 53. Overlying each section 47 are suitable contact plates 54 that are secured in place by screws 55. Each end of the shoe assembly is fitted with a leaf spring 56 one end portion of which is secured to one of the sections 47 and the free end portion of which slidably bears against the other section 47. Each section 47 is adapted, as at 56a, for connection with one end portion 57 of a shunt strap.

In the operation of the shoe assembly D, the sections 47—47 may tilt fore and aft and/or to either side respectively upon the stud heads 51—51, as required, independently of one another. Normally, the plane containing the axes of the studs 51—51 is normal to the vertical median plane of the conductor 10, but when the base assembly A shifts laterally relative to the vertical median plane of the conductor 10, these studs 51—51 are displaced from their plane, in consequence of which the sections 47—47 shift longitudinally relative to one another, as illustrated in FIGURE 9.

Referring particularly to FIGURES 10 through 14, the modified shoe assembly shown, designated E, includes a pair of longitudinally extending generally flat rectangular sections 58—58 that are oppositely inclined to conjointly form a shoe of inverted V shape. Extending across and depending from the bottom of each section 58, in laterally spaced parallel relation to one another, are a pair of projections 59 and 60. Each of these projections is suitably recessed to form a pair of laterally spaced parallel arms, the arms of the projection 59 being designated 61—61 and the arms of the projection 60 being designated 62—62. The several projections 59 and 60 are alternately arranged and each is seated upon a horizontally extending pin 63 with the arms thereof straddling the latter, as shown. The pin 63 is projected through the eye 64 of an upright bolt 65, which eye 64 intervenes the projections 59—59. For securing the projections aforesaid against detachment from the pin 63, the same are fitted with bolts 66 and washers 67, and the pin 63 is fitted with cotter pins 68—68. Extending laterally from the face of each projection 59 that is opposed to the eye 64 is a protuberance 69 that tapers axially of the pin 63, as shown. Overlying each section 58 are suitable contact plates 70 that are secured in place by screws 71, and each section 58 is adapted, as at 72, for connection with a shunt strap. It will be understood that the bolt 65 is projected through and secured to the boss 37 by a nut 73.

The internal diameter of the eye 64 is somewhat larger than the diameter of the pin 63, and the clear distance between the protuberances 69—69 is somewhat greater than the distance through the eye 64 in the direction of its thickness, in consequence of which the pin 63 is free to tilt fore and aft, and turn from side to side in the eye 64, as shown in FIGURE 13. Therefore, in the operation of the shoe assembly E, the sections 58—58 may tilt fore and aft and turn from side to side together with the pin 63, but they may tilt to either side, i.e., turn on the pin 63, independently of one another. To disassemble the shoe E, it is necessary merely to first remove one of the cotter pins 68, and then to remove the pin 63.

Referring particularly to FIGURES 15 through 17, the modified shoe assembly shown, designated F, includes a pair of longitudinally extending generally flat rectangular sections 74—74 that are oppositely inclined to conjointly form a shoe of inverted V shape. Underlying each section 74 are reinforcing ribs 75, and extending across and depending from the bottom of each section 74, in laterally spaced parallel relation to one another, are a pair of projections 76—76. Each of these projections is suitably recessed to form a pair of laterally spaced parallel arms 77—77, and the several projections 76 are alternately arranged and each is seated upon one trunnion of a pair of trunnions 78—78 that extend horizontally outwardly in opposite directions from opposite sides of a socketed element 79, with the arms thereof straddling the trunnion, as shown. For securing the projections aforesaid against detachment from the trunnions 78—78, the same are fitted with bolts 80. The socketed element 79 is fitted over and seated upon the rounded head 81 of an upright bolt 82 that is projected through and secured to the boss 37 by a nut 83. Overlying each section 74 are suitable contact plates 84 that are secured in place by screws 85, and each section 74 is adapted, as at 86, for connection with a shunt strap.

In the operation of the shoe assembly F, the sections 74—74 may tilt fore and aft and turn about the axis of the bolt 82 together with the trunnions 78—78 and socketed element 79, but they may tilt to either side, i.e., turn on the trunnions 78—78, independently of one another. To disassemble the shoe F, it is necessary merely to first lift the shoe from the bolt 82, and then to remove the bolts 80.

It will be understood, of course, that the present invention as hereinbefore described and as shown in the accompanying drawings is susceptible of various changes and modifications which may be made from time to time without departing from the general principles or real spirit of the invention, and accordingly it is intended to claim the same broadly, as well as specifically, as indicated by the appended claims.

What is claimed as new and useful is:

1. In apparatus for collecting current from an electric power line for transmission thereof to a mobile unit, an upright base having a pair of complementary parts electrically insulated from one another and movable relative to one another about the vertically extending principal axis of said base, said base complementary parts comprising an upright spindle and a hollow jacket fitted over the top and extending downward about the sides of the spindle and including dielectric means interposed between said spindle and jacket which transmits the mechanical load on said jacket to said spindle, an arm extending laterally from said base and connected to said jacket for pivotal movement about a horizontal axis and for pivotal movement about said vertically extending principal axis, means for mounting a contact shoe upon the free end portion of said arm for operation of a shoe so mounted in contact with the power line throughout the range of pivotal movement of said arm, an electrical shunt, means for connecting said shunt to a contact shoe mountable to the said arm as aforesaid for conducting electric current to the mobile unit to thereby by-pass the arm, and means operating to bias said arm upwardly toward the undersurface of said power line.

2. In apparatus for collecting current from an electric power line for transmission thereof to a mobile unit as defined in claim 1 wherein said spindle has a rounded upper terminal surface, and the hollow jacket is internally lined with electric insulating material with a portion of said insulating material bearing upon said rounded upper terminal surface of the spindle.

3. In apparatus for collecting current from an electric power line for transmission thereof to a mobile unit as defined in claim 2 further including a sealing ring which embraces a lower end portion of said spindle and extends about the interior of said jacket for sealing the space thereabove, intervening said spindle and jacket, against escape of any lubricant injected thereinto, said sealing ring being flexible for yielding to permit escape of any excess lubricant.

4. In apparatus for collecting current from an electric power line for transmission thereof to a mobile unit as defined in claim 1, a coil tension spring having an end anchored to said jacket and the opposite end anchored to a portion of said arm remote from said base and operating to bias said arm upward toward the undersurface of said power line.

5. In apparatus for collecting current from an electric power line for transmission thereof to a mobile unit as defined in claim 4 wherein the arm is in the form of a guard overlying the base and tension coil spring and operating to protect the same against the elements.

6. In apparatus for collecting current from an electric power line for transmission thereof to a mobile unit as defined in claim 4 wherein the free end portion of the arm mounts an axially shiftable pin, and the end of the coil tension spring remote from the base embraces said pin and operates to secure the same against axial displacement.

7. In apparatus for collecting current from an electric power line for transmission thereof to a mobile unit, an upright base having a pair of complementary parts electrically insulated from one another and movable relative to one another about the vertically extending principal axis of said base, and a horizontally extending shaft mounted upon one of said parts and extending transversely freely through the other of said parts, an arm extending laterally from said base and mounted upon said shaft for vertical swinging movement and for horizontal swinging movement with said shaft and shaft mounting part as a unit about the other of said parts, means for mounting a contact shoe upon the free end portion of said arm for operation of a shoe so mounted in contact with the power line throughout the range of swinging movement of said arm, an electrical shunt, means for connecting said shunt to a contact shoe mountable to the said arm as aforesaid for conducting electric current to the mobile unit to thereby by-pass the arm, and means operating to bias said arm upwardly toward the undersurface of said power line.

8. In apparatus for collecting current from an electric power line for transmission thereof to a mobile unit as defined in claim 7 wherein one of the base parts is a centrally located upright spindle, the other base part is a hollow jacket internally lined with electric insulating material and fitted over the top of the spindle with said insulating material bearing upon the latter, the shaft extends through opposed wall areas of said jacket, and the portion of said shaft intervening said wall areas passes freely through an opening extending transversely through said spindle, which opening is of a diameter substantially enlarged relative to the diameter of said shaft to permit limited swinging movement of said shaft relative to and about the axis of said spindle.

9. In apparatus for collecting current from an electric power line for transmission thereof to a mobile unit as defined in claim 7 wherein one of the base parts is a centrally located upright spindle, the other base part is a hollow jacket internally lined with electric insulating material and fitted over the top of the spindle with said insulating material bearing upon the latter, and the shaft extends through opposed wall areas of said jacket and jacket lining insulating material, and the portion of said shaft intervening said jacket wall areas passes freely through an opening extending transversely through said spindle, which spindle opening is of a diameter substantially enlarged relative to the diameter of said shaft to permit limited swinging movement of said shaft relative to and about the axis of said spindle, the clear distance between said shaft and spindle being greater than the clear distance between said shaft and jacket lining insulating material.

10. In apparatus for collecting current from an electric power line for transmission thereof to a mobile unit as defined in claim 7 wherein one of the base parts is a centrally located upright spindle, the other base part is a hollow jacket internally lined with electric insulating material and fitted over the top of the spindle with said insulating material bearing upon the latter, the shaft extends through opposed wall areas of said jacket, the portion of said shaft intervening said wall areas passes freely through an opening extending transversely through said spindle, which opening is of a diameter substantially enlarged relative to the diameter of said shaft to permit limited swinging movement of said shaft relative to and about the axis of said spindle, and a ring embracing a lower end portion of said spindle and extending about the interior of said jacket for sealing the space thereabove intervening said spindle and jacket and extending about said shaft, against escape of any lubricant injected thereinto, said sealing ring being flexible for yielding to permit escape of any excess lubricant.

References Cited in the file of this patent

UNITED STATES PATENTS

| | | |
|---|---|---|
| 457,378 | Short | Aug. 11, 1891 |
| 522,057 | Heastings | June 26, 1894 |
| 528,149 | Cobb | Oct. 30, 1894 |
| 700,544 | McCullough | May 20, 1902 |
| 761,565 | Walker | May 31, 1904 |
| 979,940 | Feist | Dec. 27, 1910 |
| 1,447,217 | Lincoln | Mar. 6, 1923 |
| 1,487,311 | Bower | Mar. 18, 1924 |
| 1,498,693 | Lyle | June 24, 1924 |
| 1,519,321 | Moore | Dec. 16, 1924 |
| 1,564,727 | Hooydonk | Dec. 8, 1925 |
| 1,614,201 | Larsson | Jan. 11, 1927 |
| 1,770,229 | Dippman et al. | July 8, 1930 |
| 1,916,544 | Whitted | July 4, 1933 |
| 1,918,854 | Mead | July 18, 1933 |
| 2,201,422 | Beebe | May 21, 1940 |
| 2,211,221 | Wilkerson | Aug. 13, 1940 |
| 2,738,535 | Horton | Mar. 20, 1956 |
| 2,790,990 | Wallis | May 7, 1957 |
| 2,850,755 | Deibel | Sept. 9, 1958 |
| 2,944,831 | Thomas | July 12, 1960 |

FOREIGN PATENTS

| | | |
|---|---|---|
| 173,031 | Austria | Nov. 10, 1952 |
| 207,260 | Austria | Jan. 25, 1960 |